United States Patent [19]

Tuccinardi et al.

[11] 4,308,501
[45] Dec. 29, 1981

[54] DIGITAL PEAK SENSOR

[75] Inventors: Thomas E. Tuccinardi, Silver Spring, Md.; Michael Conner, Washington, D.C.

[73] Assignee: The United States of America as represented by the Secretary of the Army, Washington, D.C.

[21] Appl. No.: 621,706

[22] Filed: Oct. 9, 1975

[51] Int. Cl.³ .................... H03K 5/153; F42C 13/08
[52] U.S. Cl. .................................. 328/150; 102/212; 102/417; 102/427; 324/260; 307/351
[58] Field of Search .................... 328/151, 150, 5; 307/235 A, 351; 102/16, 18 M, 19.2, 70.2 R, 18; 324/34 PS, 34 D, 260; 340/347 AD

[56] References Cited
U.S. PATENT DOCUMENTS

| | | | |
|---|---|---|---|
| 3,659,208 | 4/1972 | Fussell | 328/151 |
| 3,813,601 | 5/1974 | Reindl | 328/151 |
| 3,828,259 | 8/1974 | Riethmuller et al. | 328/151 |

*Primary Examiner*—Howard A. Birmiel

*Attorney, Agent, or Firm*—Nathan Edelberg; Robert P. Gibson; Saul Elbaum

[57] ABSTRACT

A digital circuit for sensing peaks exceeding a predetermined threshold in analog signals employs clock and control oscillators arranged such that their frequencies vary in opposite senses in response to changes in the sensed signal. The clock oscillator frequency is counted during sample intervals of durations which vary inversely with the control oscillator frequency. A count increase (or decrease) of predetermined amount from one sample interval to the next, followed by a count decrease (or increase) from another sample interval to the next, results in an output signal. In a preferred embodiment, the clock frequency is counted in an up-/down counter which, for each sample interval, is counted up and down for equal numbers of control oscillator cycles. The net count at the end of a sample interval is therefore an indication of the magnitude and polarity of changes in the sensed signal. In a particular utilization the circuit serves in a mine fuze and senses the peak of a magnetic field signal such as is associated with a tank or other vehicle.

10 Claims, 2 Drawing Figures

DIGITAL PEAK SENSOR

RIGHTS OF THE GOVERNMENT

The invention described herein may be manufactured, used, and licensed by or for the United States Government for governmental purposes without the payment to us of any royalty thereon.

BACKGROUND OF THE INVENTION

The present invention relates to signal peak sensing and more particularly to a versatile, low-cost digital sensor capable of accurately detecting the occurrence of peaks in analog signals. Although the circuits described herein are specifically concerned with sensing the peaks of analog magnetic field signals, peak sensing in other types of analog signals may also be performed in accordance with the principles of the present invention.

Magnetically influenced mine fuzes operate on the magnetic field intensity signal associated with target vehicles such as tanks. The goal is to detect when the field signal has peaked so that the fuze can be fired at the proper time relative to the position of the vehicle. Prior art attempts at providing such fuzes include a magnetic dip needle threshold detector. This approach suffers from a tendency toward firing too early in response to high amplitude magnetic signatures of vehicles travelling at low speeds and firing too late in response to small amplitude signatures of high speed vehicles. The problem derives from the fact that absolute threshold level detection does not account for either variations in the different magnetic signature amplitudes presented by different vehicles or vehicle speed. It was therefore subsequently determined that a more accurate firing time is achieved if the magnetic field amplitude is sensed to first determine if a threshold has been reached and to then determine when the amplitude begins to change in an opposite sense (i.e.—begins to decrease from a peak). Detecting the threshold first minimizes the possibility that noise will trigger the fuze. Subsequent detection of an over-the-peak condition assures that the vehicle is still over the mine. In spite of this recognition of a better criterion for fuze firing, prior art fuzes employing this criterion have the disadvantages of lack of versatility, high cost, and large size. These disadvantages derive because prior art fuzes have processed the magnetic field signal in analog form.

It is therefore an object of the present invention to provide a low-cost, versatile digital mine fuze.

It is another object of the present invention to provide a low-cost, versatile digital mine fuze which provides a firing signal after detecting an analog threshold level followed by an over-the-peak signal condition.

In a more general sense, it is an object of the present invention to provide a digital approach to sensing analog signal peaks, or more accurately, for sensing the beginning of a fall off from such signal peaks.

SUMMARY OF THE INVENTION

In accordance with the present invention, the magnetic field signature of a tank or other vehicle is sensed by two thin film inductors having inductances which vary with the surrounding magnetic field. The two inductors have their sensitive axes oppositely oriented so that their inductances change in opposite senses in response to changes in the surrounding magnetic field. Each inductor serves as a frequency-controlling element in an oscillator, whereby the oscillator frequencies change in opposite senses in response to a magnetic field change. One oscillator, designated herein as the clock oscillator, provides a series of clock pulses to be counted in an up/down counter. The other oscillator, designated as the control oscillator, provides pulses which are counted by a control counter. The control counter provides repetitive sample intervals, each consisting of a fixed number of clock oscillator pulses. Signals derived from the control counter permit the up/down counter to count clock pulses up for half the control counts and down for half the control counts in each sample interval. If the surrounding magnetic field is constant during the sample interval, the up counts equal the down counts, leaving a net count of zero in the up/down counter. If the magnetic field changes during the sample interval, a net count (up or down depending on the polarity of the field change) exists in the up/down counter after the sample interval. If the net count exceeds a pre-established threshold count, a flip-flop is set. When the up/down counter next contains a net count of opposite sense, indicating an over-the-peak condition in the magnetic field change, the fuze is fired.

The immediate conversion of the analog magnetic field signal to digital form permits processing to be totally performed digitally. This, in turn, permits use of small and inexpensive integrated circuits and permits simple adjustment of the threshold to achieve optimum firing for different applications.

An important feature of the invention resides in the fact that the oscillators change frequency in opposite senses in response to field change. This produces a multiplicative counting effect in the sensor because increases in clock frequency are accompanied by longer sampling intervals whereas decreasing clock frequencies are accompanied by shorter sampling intervals. This multiplicative effect renders the sensitivity of the device quite high.

DESCRIPTION OF PREFERRED EMBODIMENT

Figure 1:
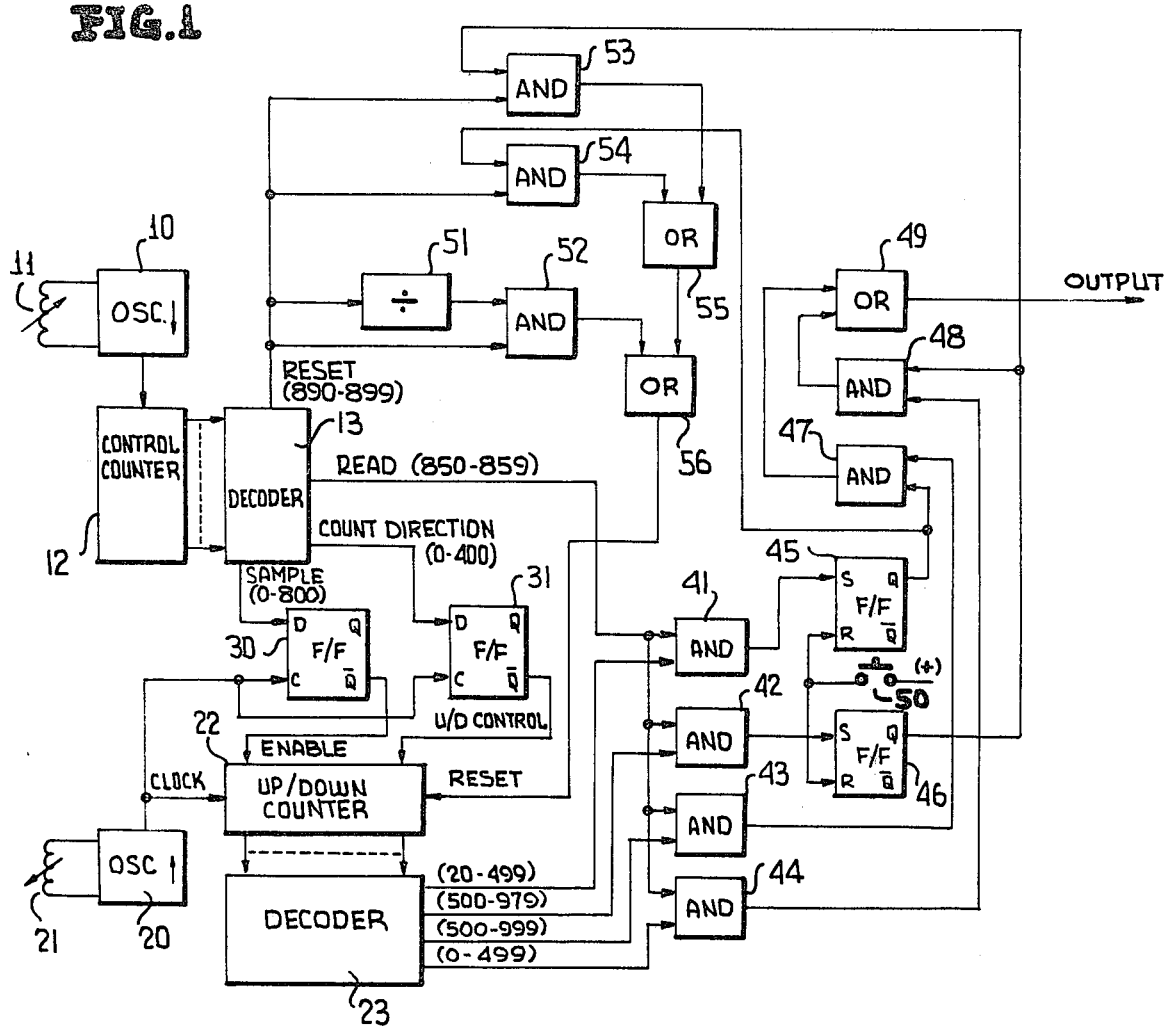
FIG. 1 is a schematic diagram in block form of a preferred embodiment of the present invention.

Referring to the drawings in greater detail, a control oscillator 10 includes a variable inductor 11 as a frequency-controlling element. Oscillator 10 can take a variety of conventional configurations in which its frequency is determined by the value of inductor 11 connected in its circuit; one such configuration is the Colpitts oscillator. Inductor 11 is a thin film inductor of the type in which inductance varies with the surrounding magnetic field. Such inductors are well-known in the prior art, as illustrated in U.S. Pat. Nos. 3,239,754 and 3,416,072. Such inductors operate on the principle that a thin film exhibits two axes of magnetization, namely an "easy" axis, and a "hard" axis. If the easy axis is parallel to the surrounding magnetic field, the inductance of the device varies in one sense with the field; if the easy axis is perpendicular to the field, the inductance of the device varies in an opposite sense with the field.

Figure 2:
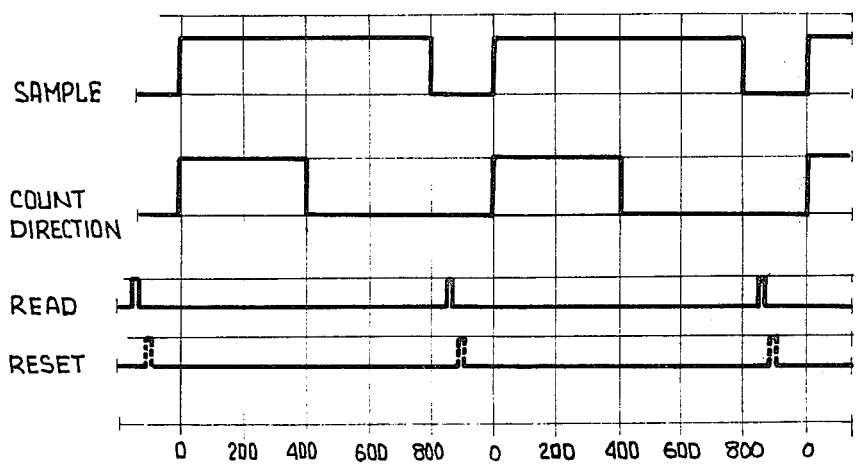
FIG. 2 is a timing diagram illustrating waveforms of signals generated in the circuit of FIG. 1.

The signal from control oscillator 10 is applied to a control counter 12 which registers one count for each cycle of the control oscillator signal. Counter 12 is a conventional binary counter which may either be arranged to automatically reset to zero after a predetermined number of counts have been registered or may simply spill over upon reaching its count capacity; either operating mode is consistent with the principles described herein. A decoder 13 responds to the binary count present in control counter 12 to provide a plurality of control signals. These signals are illustrated graphically in FIG. 2 and are designated: SAMPLE, COUNT DIRECTION, READ, and RESET (890–899).

If, for purposes of a simple example, we assume that control counter 12 re-cycles after every one thousand counts, the SAMPLE signal is provided at a logic one level from count 0 through 800. The SAMPLE signal may, of course, occupy more or less than 80% of the count cycle of control counter 12; however, there must be some finite time provided between successive SAMPLE signal periods or sample intervals in order to permit read and reset functions to be performed as described below. In addition, the SAMPLE pulse must encompass an even number of control oscillator pulses in order that the COUNT DIRECTION pulse can readily divide the sample interval in half. The COUNT INTERVAL pulse is logic one from counts 0 through 400 of control counter 12. The READ pulse occurs once each control counter cycle, after the sample interval; in the example illustrated the READ pulse is logic one from control counts 850 through 890. The RESET (890–899) pulse, as the name implies, is logic one from control counts 890 through 899; although provided by decoder 13 during every control cycle, this signal does not perform its reset functions unless certain logic conditions are met as described below.

Another oscillator, namely clock oscillator 20, has a frequency-controlling variable inductance 21 in its circuit. Oscillator 20 is similar to oscillator 10, and inductor 11 is similar to inductor 21. The difference resides in that inductors 11 and 21 have their easy or sensitive axes oppositely oriented in the surrounding magnetic field so that their inductances vary in opposite senses with the field. Consequently, the frequencies of oscillators 10 and 20 vary in opposite senses with the surrounding magnetic field.

Oscillator 20 supplies a clock signal to up/down counter 22 which, if the ENABLE signal is logic zero, registers a count for each clock cycle. The registered count is either added to or subtracted from the total in counter 22, depending upon the logic level of the U/D CONTROL signal applied to counter 22. The derivation of the ENABLE and U/D CONTROL signals are described hereinbelow. A decoder 23 receives binary signals from up/down counter 22 and provides four binary signals. Assuming, as a simplified example, a count capacity of 1000 in up/down counter 22, decoder 23 provides the following signals which are designated by the clock count interval during which they are at the logic one level: (20–499), (500–979), (500–999) and (0–499).

The SAMPLE signal from decoder 13 determines the state of the ENABLE signal applied to counter 22 and the COUNT DIRECTION signal from decoder 13 determines the state of the U/D CONTROL signal applied to counter 22. Specifically, up/down counter 22 is enabled during the sample interval (i.e. counts 0–800 of control counter 20); it counts up when the COUNT DIRECTION pulse is logic one (i.e. during counts 0–400 of control counter 20) and counts down when the COUNT DIRECTION signal is logic zero and the SAMPLE pulse is logic one (i.e. during counts 401–800 of control counter 20). However, because of the random phase relationship between oscillators 10 and 20, the SAMPLE and COUNT DIRECTION signals are not used directly in controlling up/down counter 22. Specifically, it is possible for a SAMPLE or COUNT DIRECTION signal transition to occur at the same time a clock count is to be registered at counter 22. Unless this is prevented, erroneous counting occurs. Consequently, two synchronization flip-flops 30 and 31 are provided to prevent this problem. Flip-flops 30 and 31 are clocked-data flip-flops which receive the clock pulses from oscillator 20 at their clock input terminals (C). The SAMPLE pulse is applied to the data (D) input terminal of flip-flop 30 and the COUNT DIRECTION signal is applied to the data terminal of flip-flop 31. The Q signal from flip-flop 30 is the ENABLE signal; the $\overline{Q}$ signal from flip-flop 31 is the U/D CONTROL signal. Flip-flops 30, 31 are selected so as to clock data into the flip-flop on the clock pulse transition which is opposite to that producing a count in counter 22. For example, assume counter 22 registers a count upon a transition from logic zero to logic one in the clock signal; then flip-flops 30, 31 clock the logic state at their D terminal into the flip-flop at the logic one to logic zero transition of the clock signal. In this way simultaneous change of the count and count-controlling signals is avoided.

The (20–499), (500–979), (500–999) and (0–499) signals from decoder 23 are applied to respective two-input AND gates 41, 42, 43 and 44. These and gates also receive the READ signal from decoder 13 at their other input terminals. The output signals from AND gates 41 and 42 are applied to the set (S) input terminal of respective threshold detecting flip-flops 45 and 46. The Q output signal from flip-flop 45 is applied to two-input AND gate 47; the Q output signal from flip-flop 46 is applied to two-input AND gate 48. The other input terminal of AND gate 47 receives the output signal from AND gate 43 whereas the other input terminal of AND gate 48 receives the output signal from AND gate 44. The output signals from AND gates 47 and 48 are applied to OR gate 49 which provides the OUTPUT signal for the circuit. AND gates 47, 48 and OR gate 49 serve as the over-the-peak detector portion of the circuit. Initial reset of flip-flops 45, 46 is effected at their R terminals via a signal applied when fuze arming switch 50 is actuated.

Reset circuitry includes a frequency divider 51 which receives the RESET (890–899) pulse from decoder and applies a pulse to a two-input AND gate 52 once in every ninety-five cycles of control counter 12. The other input signal to gate 52 is the RESET (890–899) signal, which is likewise applied to each of two-input AND gates 53 and 54. AND gate 53 also receives the Q output signal from flip-flop 46; AND gate 54 also receives the Q output signal from flip-flop 45. The output signals from gates 53 and 54 are combined at OR gate 55 which in turn feeds OR gate 56 along with the output signal from AND gate 52. The output signal from OR gate 56 is the RESET signal which is applied to up/down counter 22.

In considering operation of the overall circuit, assume initially that the magnetic field surrounding thin film inductors 11 and 21 remains constant, keeping the frequencies of oscillators 10 and 20 constant. Under these conditions, the number of up counts registered in counter 22 during the first half of each SAMPLE interval is equal to the number of down counts registered by that counter in the second half of the SAMPLE interval. Therefore, when the READ pulse strobes AND gates 41 and 42 after each SAMPLE interval, the net count in counter 22 is zero and neither signals (20-499) nor (500-979) is present at gates 41 or 42. Threshold flip-flops 45 and 46 therefore remain reset and disable gates 47 and 48, irrespective of the state of gates 43 and 44.

Assume now that the monitored magnetic field experiences an increased amplitude and that inductors 11 and 21 are oriented to increase the frequency of clock oscillator 20 and decrease the frequency of control oscillator 10 under such conditions. As the field increases, the frequency of clock oscillator 20 continues to increase whereas the SAMPLE interval becomes increasingly longer (i.e. the time required to achieve 800 control counts increases because of the decreasing frequency of oscillator 10). Consequently, the number of down counts registered at counter 22 during the last half on each SAMPLE interval is greater than the number of up counts registered in the first half, so that a net down count exists in counter 22 after each sample period. If the net down count exceeds 20 (which, counting down from an assumed count capacity of 1000, places a net count of 979 or less in counter 22), signal (500-979) is logic one when the READ pulse strobes AND gate 42. Therefore, gate 42 is enabled and sets threshold flip-flop 46. This indicates that a threshold has been exceeded by the sensed magnetic field and the circuit now waits for an over-the-peak condition. Before considering the over-the-peak condition, however, it should be noted that if the net down count did not exceed the threshold (assumed to be 20) in one cycle, the net down count remains in the counter and accumulates in subsequent SAMPLE intervals as the magnetic field continues to increase. When the accumulated down count finally reaches the threshold, gate 42 is enabled to set flip-flop 46. If the net down count does not reach the threshold after multiple SAMPLE cycles (for example, after ninety-five cycles), counter 22 is eventually reset to zero in a manner to be described subsequently.

When threshold flip-flop 46 is set by signal (500-979) via AND gate 42, the Q output signal from that flip-flop primes AND gate 53 in the reset circuitry. The RESET (890-899) pulse following the setting of flip-flop 46 enables AND gate 53 to enable OR gates 55 and 56. The output signal from OR gate 56 resets the up/down counter 22 so that the next SAMPLE interval can begin with a zero count accumulation. The circuit is therefore ready to detect an over-the-peak condition.

The over-the-peak condition occurs when the increased magnetic field has levelled off and begins to decrease. During the levelled off period, subsequent SAMPLE intervals result in no change in the zero net count in counter 22, because the clock oscillator frequency and the control oscillator frequency remain constant. When the field level begins to decrease, the frequency of clock oscillator 10 begins to decrease while the control oscillator frequency begins to increase. Consequently, fewer counts are registered in counter 22 during the sampling interval. More importantly, fewer counts are registered during the last half (down count period) of the sample interval than during the first half (up count interval) as long as the field decrease continues. Therefore, there is a net up count during the sample interval and signal (0-499) becomes logic one. The following READ pulse then enables AND gate 44 which in turn enables AND gate 48, the latter having been primed by the Q signal from threshold flip-flop 46. OR gate 49 is enabled by AND gate 48 to provide an output signal which fires the fuze.

If the magnetic field surrounding the inductors 11, 21 experiences a pulsed decrease, similar operation ensues except that a net up count threshold results in the excitation of AND gate 41 and flip-flop 45 via signal (20-499). Counter 22 is reset to the over-the-peak sensing condition by AND gate 54. A count polarity reversal results in signal (500-999) exciting AND gates 43 and 47 to provide the OUTPUT signal at OR gate 49.

Reset circuitry elements 51, 52, 56 serve to reset the bidirectional counter 22 periodically. This is necessary because of the tendency of the oscillators 10, 20 to drift and to minimize the effects of noise. Specifically, mutual frequency drift between the oscillators tends to add or subtract an occasional net count at counter 22, which net count would accumulate and possibly trigger a threshold flip-flop. Likewise, random variations in the surrounding magnetic field may add or subtract an occasional net count. By periodically resetting the counter these erroneous effects are avoided.

The operation of the reset circuitry proceeds as follows. Following every SAMPLE interval the RESET (890-899) signal is provided by decoder 13 at frequency divider 51 and AND gate 52. The latter gate, however, is activated only by the particular RESET (890-899) pulse which causes frequency divider 51 to cycle out. Thus, if the frequency division ratio of divider 51 is ninety-five, AND gate 52 is actuated upon every ninety-fifth RESET (890-899) pulse. AND gate 52 actuates OR gate 56 to reset counter 22.

As described, the circuit of FIG. 1 is capable of accurately firing a mine fuze in response to the sensed magnetic signature of a tank or other vehicle. The oppositely-varied oscillator concept provides excellent sensitivity because of the multiplicative effect of increasing (or decreasing) the clock frequency while increasing (or decreasing) the count duration. The use of an up/down counter to sense the net count in any SAMPLE interval is highly advantageous since it simplifies logic that would be required if counting were unidirectional only. Nevertheless, unidirectional counting is a possibility within the scope of the present invention.

It should be noted that the OUTPUT signal from OR gate 49 need not result in the immediate firing of the fuze but firing can instead be delayed to the extent desired. For example, by simply using the OUTPUT signal to enable a further counter which then counts either clock, control or SAMPLE pulses, the firing can be delayed as necessary to meet the needs of the application.

While the circuit of FIG. 1 has been described in terms of magnetic field sensing, it is also capable of responding to other conditions. For example, light or temperature sensitive resistors may be employed as frequency controlling elements in oscillators configured to change their frequency in opposite senses. Likewise, a voltage signal, derived from some sensed phenomena, can be employed to vary the frequencies of voltage controlled oscillators which, for this purpose, would replace oscillators 10 and 11. In such an embodiment, the control voltage might be passed through an inverting amplifier before being passed to one of the voltage controlled oscillators.

Frequencies of the oscillators employed herein and count capacities of the counters employed herein are a matter of choice determined by the particular application. Likewise, there is a wide choice of frequency of resetting the up/down counter. Further the oscillators may have similar or widely different nominal frequencies.

We wish it to be understood that we do not desire to be limited to the exact details of construction shown and described, for obvious modifications can be made by a person skilled in the art.

We claim:

1. Digital apparatus for sensing a peak condition in an analog-varying parameter comprising:
 a clock oscillator arranged to provide a cyclic-clock signal at a first nominal frequency;
 a control oscillator arranged to provide a cyclic control signal at a second nominal frequency;
 sensing means responsive to said analog-varying parameter for varying the frequencies of said oscillators in opposite senses as said parameter varies;
 actuable clock counter means for counting clock signal cycles when actuated;
 control counter means for counting control signal cycles and actuating said clock counter means during repetitive sample intervals containing a predetermined number of control signal cycles;
 threshold detection means for detecting when the count in said clock counter differs in one sense from a reference count by a predetermined threshold amount, said threshold detection means including means for storing an indication that the threshold amount has been exceeded;
 means for resetting said clock counter means in response to a threshold detection by said threshold detection means; and
 over-the-peak detecting means, responsive to said indication stored in said bistable means, for detecting when the count in said clock counter means differs from said reference count in an opposite sense to said one sense.

2. The apparatus according to claim 1 wherein said clock counter means is an up/down counter and wherein said reference count is zero, said apparatus further comprising means for reversing count direction at said up/down counter after half of said predetermined number of control signal cycles have been counted at said control counter means during each sample interval.

3. The apparatus according to claim 2 further comprising:
 means for providing a read pulse after each sample interval;
 and wherein said threshold detection means comprises:
 first and second flip-flop means;
 means for resetting said first and second flip-flop means upon actuation of said apparatus;
 first gating means for setting said first flip-flop means if a net up count in excess of said predetermined threshold amount is present in said up/down counter in time coincidence with said read pulse; and
 second gating means for setting said second flip-flop means if a net down count in excess of said predetermined threshold amount is present in said up/down counter in time coincidence with said read pulse.

4. The apparatus according to claim 3 wherein over-the-peak detecting means comprises:
 third gating means for providing an output signal in response to a down count existing in said up/down counter in time coincidence with said read pulse and a set condition at said first flip-flop means;
 fourth gating means for providing said output signal in response to an up count existing in said up/down counter in time coincidence with said read pulse and a set condition at said second flip-flop means.

5. The apparatus according to claim 4 further comprising means for periodically resetting said up/down counter after the occurrence of a predetermined plurality of sample intervals.

6. The apparatus according to claim 5 further comprising synchronizing means for preventing counting of a clock pulse at said up/down counter exactly at the start and end of said sample interval.

7. The apparatus according to claim 4 wherein said sensing means comprises first and second thin film inductors having easy axes arranged mutually perpendicular in a magnetic field to be sensed, each inductor being connected as a frequency-controlling element to a respective one of said clock and control oscillators.

8. The apparatus according to claim 7 employed as a proximity mine fuze sensor wherein the magnetic field to be sensed is a magnetic signature of a target vehicle.

9. The apparatus according to claim 2 wherein said sensing means comprises first and second thin film inductors having easy axes arranged mutually perpendicular in a magnetic field to be sensed, each inductor being connected as a frequency-controlling element to a respective one of said clock and control oscillators.

10. The apparatus according to claim 9 employed as a proximity mine fuze sensor wherein the magnetic field to be sensed is a magnetic signature of a target vehicle.

* * * * *